United States Patent [19]

Grainal

[11] Patent Number: 5,758,964
[45] Date of Patent: Jun. 2, 1998

[54] LOOP REACTOR APPARATUS FOR MIXING A SUBSTANCE

[75] Inventor: Freddy Grainal, Dunkerque, France

[73] Assignee: International Mixing Technologies, Sarl, Dunkerque, France

[21] Appl. No.: 728,473

[22] Filed: Oct. 10, 1996

[30] Foreign Application Priority Data

Oct. 10, 1995 [FR] France ................................. 95 12105

[51] Int. Cl.⁶ ............................................... B01F 5/12
[52] U.S. Cl. ............................................ 366/266; 366/319
[58] Field of Search ............................. 366/205, 264, 366/266, 314, 318, 603, 64–65, 96–99, 319; 241/199.12, 260.1

[56] References Cited

U.S. PATENT DOCUMENTS

| | | | |
|---|---|---|---|
| 664,130 | 12/1900 | Culmann et al. | 366/266 X |
| 784,598 | 3/1905 | Stevens | 366/266 X |
| 1,408,609 | 3/1922 | Lackey | 366/266 X |
| 1,530,494 | 3/1925 | Heiskanen. | |
| 1,541,371 | 6/1925 | Merrill. | |
| 2,282,623 | 5/1942 | Torrence | 366/266 X |
| 3,329,409 | 7/1967 | Raleigh | 366/266 X |
| 4,037,825 | 7/1977 | Burgert. | |
| 4,101,116 | 7/1978 | Haag et al. | 366/266 X |
| 4,132,666 | 1/1979 | Chikatsu et al. | |
| 4,350,444 | 9/1982 | Yargus et al. | 366/266 X |

FOREIGN PATENT DOCUMENTS

| | | |
|---|---|---|
| 2326968 | 5/1977 | France. |
| 1181675 | 11/1964 | Germany. |
| 3919828 | 12/1990 | Germany. |
| 528679 | 6/1955 | Italy ................................. 241/199.12 |
| 1806814 | 4/1993 | U.S.S.R. .......................... 366/266 |
| J04623 | of 1910 | United Kingdom. |
| 1305403 | 1/1973 | United Kingdom. |
| 1322484 | 7/1973 | United Kingdom. |
| 94/18877 | 9/1994 | WIPO. |

Primary Examiner—Charles E. Cooley
Attorney, Agent, or Firm—Kerkam, Stowell, Kondracki & Clarke; Dennis P. Clarke

[57] ABSTRACT

An apparatus for mixing a substance, the apparatus including a container, a tubular conduit axially disposed in a cavity of the container defining an inner tubular channel and an outer annular channel within the container, a conduit for admitting a substance into the cavity, a rotary device for circulating the substance in the cavity, an extraction conduit, a carrier shaft of the rotary device being guided in rotation by a bearing or other rotary guiding device proximate an end of the container at which the substance to be mixed is passed from the tubular channels into the annular channel.

10 Claims, 1 Drawing Sheet

5,758,964

LOOP REACTOR APPARATUS FOR MIXING A SUBSTANCE

BACKGROUND OF THE INVENTION

1. Field of the Invention

The invention relates to an apparatus, known as a loop reactor, for mixing a substance.

The invention relates to particular constructional features of the aforementioned apparatus.

2. Description of Related Art

Apparatuses of the above type include essentially the following:

- a tubular container of a form generated by revolution, which defines a cylindrical cavity having a longitudinal axis and defined by the opposed end faces and one side face;
- axially arranged in the cavity, a tubular conduit of a form generated by revolution, whose end face, having an outer diameter and length less than said cavity, defines an axial channel and an annular channel which communicate by their common ends;
- at least one conduit called an admission conduit, intended for introducing the substance into the cavity,
- a rotary device for circulating the substance contained in the tubular conduit, in such a manner that on the one hand, by one end of said annular conduit, it forces the substance into the annular channel, and on the other, by the other end of said tubular conduit, it aspirates the substance into this annular channel, and thereby assures the "looplike" circulation and the mixing that are sought for the substance;
- at least one conduit intended for extraction of the substance in the cavity and arranged to bring about the lifting of said substance, in the annular channel, substantially to the level of the outer face of the tubular conduit and in a predetermined plane located between the ends of this conduit.

Existing apparatuses to that end have their advantages, but the invention seeks in particular to improve their performance.

SUMMARY OF THE INVENTION

In particular, one object the invention seeks to attain is a mixing apparatus of the type referred to above whose "looplike" recirculation capacity is increased.

Another object the invention seeks to attain is a mixing apparatus which makes it possible:

- to mix a substance with an adjustable energy (that is, using terms of art, to obtain a "gentle mixture" or its opposite, an "intense mixture"),
- to mix gaseous products with liquid products (that is, using terms of art, "foaming" or "expanding" the liquids),
- to produce emulsions.

Other objects the invention seeks to attain will be mentioned in the ensuing description.

The subject of the invention is an apparatus for mixing substances, of the type referred to above, whose rotary device for causing circulation is solidly joined, on one of its ends, to a carrier shaft which by some means is guided and put into rotation along an axis substantially coinciding with that of the tubular conduit, this apparatus being characterized in particular in that the means for guiding the carrier shaft of the rotary device to rotate is located toward the particular end, of the ends of the container, at the level of which the passage of the substance from a tubular channel into an annular channel of the container is effected.

BRIEF DESCRIPTION OF THE DRAWINGS

The invention will be better understood from the ensuing description, provided by way of nonlimiting example, in conjunction with the accompanying drawing.

DESCRIPTION OF THE EMBODIMENT

Figure 1:
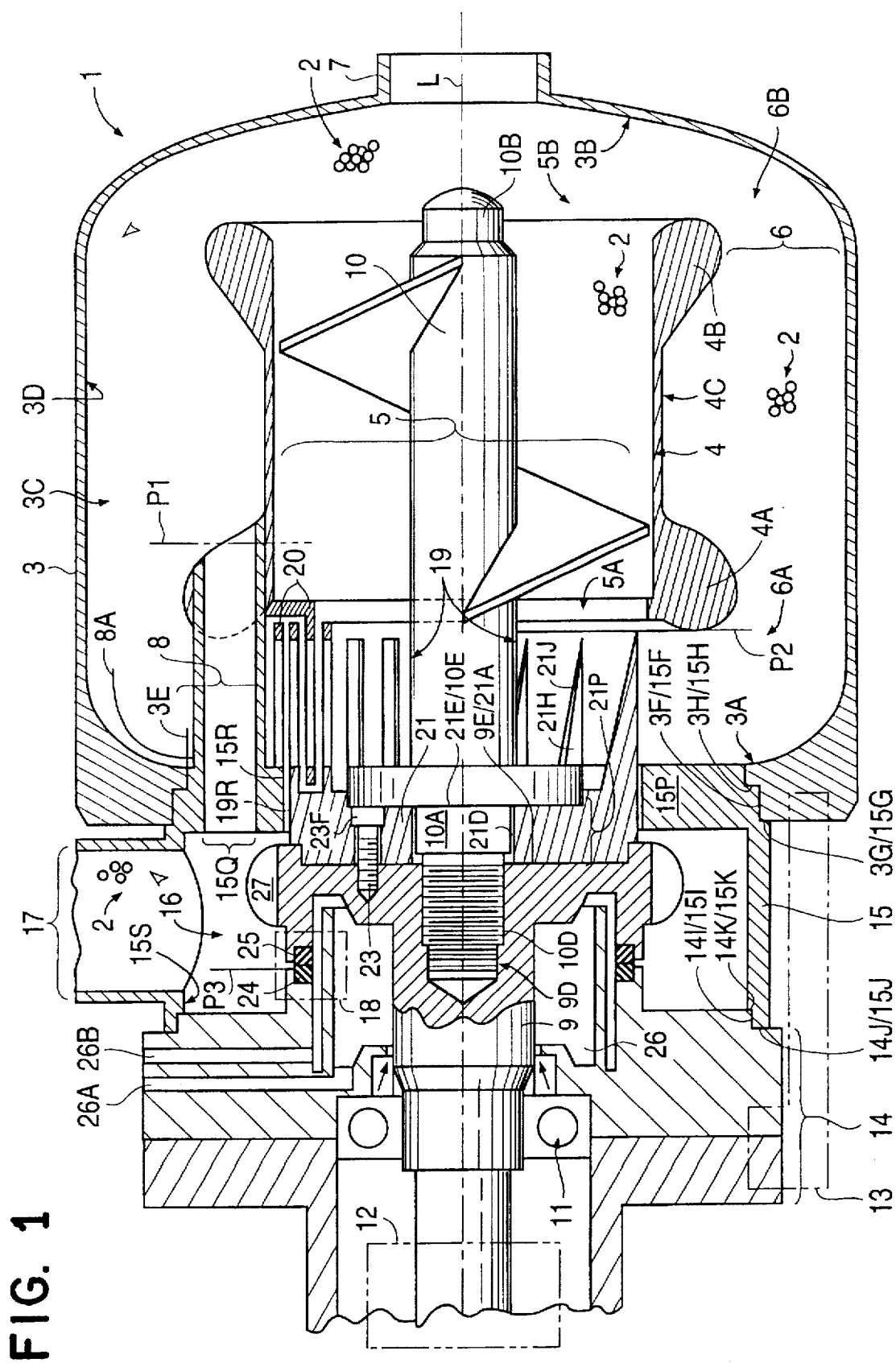
FIG. 1 shows a substantially schematic sectional view of the apparatus in a longitudinal plane.

Turning to FIG. 1 one sees an apparatus 1 for mixing a substance 2 (shown in part), in particular with a view to kneading it.

The apparatus 1 essentially includes the following:

- a tubular container 3 of a form generated by revolution, which defines a cylindrical cavity 3C having a longitudinal axis L and defined by the opposed end faces 3A, 3B and one side face 3D of predetermined length and diameter;
- axially arranged in the cavity 3, a tubular conduit 4 of a form generated by revolution, whose wall 4, whose outer diameter and length are less than those of the side face 3D of the cavity 3C, defines an axial channel 5 and an annular channel 6 which communicate by their common ends 5A, 6A and 5B, 6B;
- at least one conduit 7 called an admission conduit, intended for introducing the substance 2 into the cavity 3C,
- a rotary device 10 for circulating the substance 2 contained in the tubular conduit 4, in such a manner that on the one hand, by one end 4A of said annular conduit 4, it forces the substance into the annular channel 6, and on the other, by the other end 4B of said tubular conduit 4, it aspirates the substance into this annular channel 6, and thereby assures the desired "looplike" circulation and the mixing of the substance 2;
- at least one conduit 8 intended for extracting the substance from the container 3 and arranged to bring about the lifting of said substance 2, in the annular channel 6, substantially to the level of the outer face 4C of the tubular conduit 4 and in a predetermined plane P1 located between the ends 4A, 4B of this conduit.

In the drawing, the longitudinal dimensions of the container 3, the tubular conduit 4, and the rotary device 10 have been reduced considerably.

One skilled in the art can also determine the position of the plane P1 for lifting the substance 2 in the container.

Although this is not shown in the drawing, the longitudinal axis L of the container 3 is advantageously vertical, but is not limited to that.

The rotary device 10 advantageously comprises a male-threaded screw, but is not limited to that.

The rotary device 10 for causing circulation is solidly joined, on one end 10A of its ends 10A, 10B, to a carrier shaft 9, which by means 11, 12 is guided and put into rotation along an axis L substantially coinciding with that of the tubular conduit 4.

The means 11, 12 for guiding and causing rotation are at least indirectly solidly joined to the container 3.

Unlike known apparatuses, in a notable way, the means 11 for guiding the rotation of the carrier shaft 9 is located toward the end 3A of the ends 3A, 3B of the container 3 that is at the level at which the substance 2 passes from the tubular channel 5 into the annular channel 6.

One skilled in the art can also determine the exact nature of the guide means 11, but advantageously this means includes at least one ball bearing.

The motive means 12 advantageously includes an electric motor whose rotary speed is adjustable, such as a motor controlled via a frequency changer (not shown).

On one end 3A of its ends 3A, 3B and by a support and fixation means 13, the container 3 is at least indirectly joined to a stand 14.

Notably:

the container 3 is constituted by a wall 3 substantially forming a cylindrical bell;

into the one 3B of the end faces 3A, 3B of the cavity 3C of this bell, the conduit 7 discharges that is intended to introduction the substance 2 into the cavity 3C, discharging substantially axially of the tubular conduit 4 and face to face with the free end 10B of the rotary device 10;

in the other 3A of its end faces 3A, 3B, there is a cutout 3E whose cross section is at least large enough to allow the axial engagement of the tubular conduit 4, and extending around this cutout is at least one bearing surface 3F, 3G, 3H of a form generated by revolution for supporting and centering the container on at least one complementary bearing surface 15F, 15G, 15H formed at least indirectly by the stand 14.

Thus conceived of, the apparatus 1 is especially rigid, and therefore allows the rotary device to be driven at high speed, without causing the apparatus to vibrate.

This makes it possible in particular to shorten the length of the processing cycles of the substance or increasing mixing of the substance for the same cycle length as the traditional length.

This type of construction also makes it possible to simplify the manufacture of the apparatus and later to facilitate its repair and maintenance.

Preferably, three bearing surfaces 3F, 3G, 3H of a form generated by revolution extend around the cutout 3E, of which one is a centering bearing surface 3F, one an axial support bearing surface 3G, and one a sealed support bearing surface 3H.

Notably, the tubular conduit 4 is solidly joined, at least indirectly, on its end 4A closest to the cutout 3E of the container 3, to a part 15 called an interface, which includes on the one hand at least one supporting and centering bearing surface 15F, 15G, 15H of a form generated by revolution, intended for cooperation with at least one complementary bearing surface 3F, 3G, 3H formed by the wall of the container 3, and on the other, at least one supporting and centering bearing surface 15I, 15J, 15K of a form generated by revolution, intended for cooperation with at least one complementary bearing surface 14I, 14J, 14K formed by the stand 14 of the container 3, in which a chamber 16 is formed which in turn is called the collection chamber of the substance 2 mixed in the container and which opens into a conduit 17 for evacuation of the substance 2 leaving the container, is axially crossed by the carrier shaft 9, has a wall 15P which extends over the entire cross section of the cutout 3E of the container 3 and reserved in which are on the one hand at least one orifice 15Q opening into a conduit 8 for extracting the substance 2 and on the other a cylindrical bore 15R of a form generated by revolution that is crossed at least by the carrier shaft 9.

Notably, the interface part 15 comprises a wall 15 that substantially takes the form of a cylindrical, and in particular shallow, bell.

This lends it great mechanical strength.

Notably, at the level of the bore 15R reserved, in the interface part 15, for the passage of the carrier shaft 9, on the one hand, said shaft 9, at least indirectly facing the cylindrical face 15R of the bore 15R, has a cylindrical face 19R of a form generated by revolution, and on the other, the diameter of the bore 15R and the face 19R that face one another are fixed in order between them to determine a play that is sufficient to allow free rotation of the shaft but insufficient to allow a significant escape of substance 2.

Notably, at the level of its portion equipped with at least one supporting and centering bearing surface 15I, 15J, 15K of a form generated by revolution, intended for cooperation with at least one complementary bearing surface 14I, 14J, 14K formed by the stand 14, the interface part 15 has a cutout 15S whose cross section is substantially identical to the cross section of the collection chamber 16.

Notably, on the one hand, the interface part 15 has two opposed groups of three bearing surfaces of a form generated by revolution (15F, 15G, 15H) and (15I, 15J, 15K), of which two bearing surfaces 15F, 15I are for centering, two bearing surfaces 15G, 15J are for axial support, and two bearing surfaces 15H, 15K are for sealed support, and on the other, these bearing surfaces 15F–15J of a form generated by revolution are substantially coaxial.

One skilled in the art can determine the nature of the aforementioned bearing surfaces (15F, 15G, 15H) and (15I, 15J, 15K), but advantageously:

the axial centering bearing surfaces 15F, 15I are surfaces advantageously located cylindrically of a form generated by revolution which are coaxial, the axial support bearing surfaces 15G, 15J are surfaces advantageously located in a plane orthogonal to the longitudinal axis L of the container 3, the sealing support bearing surfaces 15H, 15K are surfaces advantageously located in a plane orthogonal to the longitudinal axis L of the container 3.

The forms and positions of the bearing surfaces 14I, 14J, 14K of the stand 14 and 3F, 3G, 3H of the container 3, with which the interface part 15 must cooperate, are dictated by those of the bearing surfaces (15F, 15G, 15H) and (15I, 15J, 15K) of that part.

Also notably, the means 13 for supporting and fixing the container 3 to the stand 14 include on the one hand the interface part 15 and on the other devices (not shown) for energetically pressing the axial support bearing surface of the container 3 against the complementary bearing surface of the interface part 15, and thus pressing the complementary bearing surfaces for axial support of the interface part 15 and the stand 14 against one another. Advantageously, these energetically pressing devices comprise draw bars that extend on the periphery of the interface part 15 and that each have two ends, of which on the one hand one end is pivotably connected to the stand 14 in a plane that includes the longitudinal axis L of the container, and on the other, an opposite, male-threaded end is intended to receive a nut that in turn is intended to be pressed against a bearing surface provided for that end on the container 3.

Notably:

the means 11 for guiding the rotation of the carrier shaft 9 is supported by the stand 14, a rotating sealing means 18 is located between the portion of the shaft 9 located in the collection chamber 16, on the one hand, and the stand 14, on the other.

Although not shown in the drawing, the apparatus 1 for mixing according to the invention employs a plurality of extraction conduits 8 which are arranged around the tubular conduit 4.

Notably, the extraction conduits 8 on the one hand each have one end 8A solidly joined to the interface part 15 and are substantially tangent to the end face 4C of the tubular conduit 4, and on the other are associated with the tubular conduit 4 in such a way as to carry the end 4b of this tubular conduit 4 by which the rotary device 10 extracts the substance 2 from the axial channel 5, in a predetermined plane P2 located between the end faces 3A, 3B of the container.

One skilled in the art will be able to determine the position of the plane P2 of the end 4A of the tubular conduit.

As is shown in the drawing, the apparatus 1 includes a means 19 for mechanical action on the substance 2, especially by shearing action, at the time of the passage of the substance from the axial channel 5 into the annular channel 6.

This mechanical action means 19 includes two cooperating parts of which on the one hand at least one part 20, associated with the end 4A of the ends 4A, 4B of the tubular conduit 4 at the level of which the rotary device 10 extracts the substance 2 from the axial channel 5 so as to force it into the annular channel 6, and on the other, at least one part 21 associated with the carrier shaft 9.

Conventionally, the parts 20, 21 of the means 19 for mechanical action on the substance consist of coaxial tubular portions in which windows are cut out, which when the windows coincide allow the passage of a flow of substance from the axial channel 5 into the annular channel 6, and when this coincidence ceases, they induce the shearing action on the flow of substance 2.

Notably:

in order to be mounted on the carrier shaft 9, the rotary device 10 has on the one hand a male-threaded part 10D for cooperation with a female-threaded bore 9D made axially in the carrier shaft 9 and on the other, a surface 10E for axial support at least indirectly against an axial stop 9E, 21E of said shaft, such as an end face 9E of this shaft, the one 21 of the parts 20, 21 of the mechanical action means 19 of the substance which is associated with the carrier shaft 9 includes a plate 21P, whose thickness is determined by two opposed faces 21A, 21E, of which one face 21A is for support on the axial stop 9E of the shaft 9 and one face 21E is for the axial support of the rotary device 10, which is perforated in its center by a bore 21D for the passage of the male-threaded part 10D of the rotary device 10, which is equipped with connection devices 23 that can be dismantled from the carrier shaft 9, such as screws, whose heads 23F are accommodated in the countersunk recesses made in the face 21E that receives the rotary device 10 for axial support.

One skilled in the art will be able to choose the helical direction of the male- and female-threaded parts to enable assembling the rotary device 10 and the carrier shaft 9 as a function of their functional direction of rotation.

These technical features, shown in the upper half of the drawing, allow the part 21, of the parts 20, 21 of the mechanical action means 19, that is associated with the carrier shaft 9 to be removed.

Advantageously, the part 21 of the mechanical action means 19 that is associated with the carrier shaft 9 is equipped with a plurality of knives 21H, which each have at least one cutting edge 21J located in on a conical envelope that is substantially coaxial with the tubular channel 5.

This technical feature, shown in the lower half of the drawing, makes it possible to assure cutting of fibers included in the substance 2 when they exit the axial channel 5.

The presence of these knives considerably lessens the risk of clogging up the mixing apparatus with fibers.

The rotating sealing means 18 between the portion of the shaft 9 located in the collection chamber 16, on the one hand, and the stand 14, on the other, includes two rings 24, 25, one of which is at least indirectly solidly joined to the stand 14 and the other is at least indirectly solidly joined to the carrier shaft 9, and which rings cooperate via faces located in a plane P3 orthogonal to the axis L of rotation of the shaft 9, close a cavity 26, substantially coaxial with the collection chamber 16, in which a heat exchange fluid not shown circulates in order to cool said fixtures 24, 25.

The heat exchange fluid is oriented in the cavity 26 by channels 26a, 26b.

Notably, in its portion located in the collection chamber 16 for the substance 2 leaving the extraction conduits 8, the carrier shaft 9 has a plurality of vanes 27 which extend radially to its periphery.

These vanes 27 centrifuge the substance 2 and make it possible to facilitate the evacuation of the collection chamber 16.

Although this is not shown in the drawing, one skilled in the art, noting the aforementioned technical characteristics, will be able to construct a mixing apparatus in which the ratio of length to diameter of the rotary device 10 is markedly increased, without giving rise to the fear that a critical rotary speed, in the functional range of the apparatus, will occur.

The function of the apparatus is silent, since it is accomplished without vibration.

In a preferred embodiment, on the one hand, the longitudinal axis "L" of the cylindrical cavity 3C of the tubular container is substantially vertical, and on the other, the tubular container 3 is oriented such that its inlet conduit 7 is located in its lower portion.

The stand 14 is supported by a structure (not shown) capable of being supported on a horizontal support in such a way that the container 3 is suspended at such a height from said horizontal support (also not shown) that a free vertical distance that is at least equal to the longitudinal dimension of the container remains between this support and the lower portion of the container.

These last characteristics allow easy dismantling and assembly of the apparatus.

The tubular conduit 4 preferably has a circular cross section.

In a preferred embodiment, the tubular conduit 4 includes at least one longitudinal ridge projecting from its inside face.

Such a ridge makes it possible to slow down the rotation of the substance in the conduit and to exert a knifelike effect on said substance.

Preferably, the tubular conduit 4 includes two longitudinal ridges that are diametrically opposite one another.

In a preferred embodiment, the tubular conduit 4 is constituted by the assembly, in a medial plane containing the longitudinal axis L of the conduit, of two tubular semiconduits, whose longitudinal axes are located on either side of said longitudinal axis of the conduit.

These technical features make it possible to construct a mixing apparatus that has the two longitudinal ridges sought.

What is claimed is:

1. An apparatus for mixing a substance, the apparatus comprising:

a tubular container of a form generated by revolution, said tubular container defining a cylindrical cavity having a longitudinal axis, said cylindrical cavity being defined by a first end face and a second end face opposed to said first end face, and a side face of predetermined length and diameter;

a tubular conduit of a form generated by revolution, said tubular conduit being axially arranged in said cavity, a wall of said tubular conduit having an outer diameter and a length less than an outer diameter and a length of said side face of said cavity, said tubular conduit defining an axial channel extending through said tubular conduit, said tubular conduit further defining an annular channel outside of said tubular conduit, said axial channel and said annular channel being in fluid communication with each other at a first and a second end of each of said axial channel and annular channel;

a rotary device for circulating said substance contained in said tubular conduit, said rotary device being so constructed and arranged that said rotary device forces said substance into said annular channel at a first end of said annular channel, and aspirates said substance from said annular channel at a second end of said annular channel opposite said first end, to thereby assure a desired looplike circulation and mixing of the substance;

a first end of said rotary device being securely joined to a carrier shaft, said carrier shaft having means for guiding said carrier shaft and permitting rotation of said carrier shaft about an axis substantially coinciding with an axis of said tubular conduit;

said carrier shaft guiding means being located proximate said first end of said container, said first end of said container being an end where, upon mixing, the substance passes from said axial channel to said annular channel;

an admission conduit disposed in one of said first and said second end faces of said cavity, said admission conduit being so constructed and arranged to introduce said substance into said cavity, with a discharge of said admission conduit being further so constructed and arranged to discharge said substance into said cavity substantially coaxially with said tubular conduit proximate a second end of said rotary device opposite said first end of said rotary device;

a cutout disposed in the other of said first and second end faces of said cavity, said cutout having a cross-section at least large enough to allow the axial engagement of said tubular conduit, said cutout defining a bearing surface extending around said cutout, said bearing surface being of a form generated by revolution, said bearing surface being so constructed and arranged to permit said container to be supported and centered on a complementary bearing surface formed by a stand;

at least one extraction conduit for extracting the substance from the container, said extraction conduit being so constructed and arranged to bring about a lifting of said substance in said annular channel substantially to a level of the outer face of said tubular conduit of a predetermined plane located between the first and second ends of the tubular conduit;

an interface member disposed at an end of said container proximate said cutout, said interface member being joined to said tubular conduit, said interface member having a first interface bearing surface of a shape complementary to the shape of said bearing surface defined by said cavity, and a second interface bearing surface of a form generated by revolution, said second interface bearing surface being so constructed and arranged to join to a complementary bearing surface formed on a stand, said interface member further having a collection chamber formed therein for collecting said substance mixed in said container upon said substance being extracted through said extraction conduit, said chamber opening to, and being in fluid communication with, an evacuation conduit;

said carrier shaft extending axially into said chamber; and said interface member having a lower wall which extends over an entire cross-sectional area of said cutout in said container, said lower wall having an orifice opening to said extraction conduit and said lower wall having a cylindrical bore therethrough through which said carrier shaft extends.

2. The apparatus of claim 1, wherein said cylindrical bore in said interface member and a cylindrical portion of said carrier shaft disposed within and facing said bore are sized such that said shaft may freely rotate within said cylindrical bore, and a gap between said cylindrical portion of said carrier shaft and a face of said bore being sufficiently small to substantially preclude escape of said substance being mixed through said gap.

3. The apparatus of claim 1, wherein said interface member has, at an upper portion at which said second bearing surface is disposed, an interface cutout of substantially identical cross-section to a cross-sectional dimension of said collection chamber.

4. The apparatus of claim 1, further comprising a plurality of extraction conduits positioned around said tubular conduit, each of said plurality of extraction conduits being connected at an upper end to said interface member and connected at a lower end to an upper portion of said tubular conduit to carry and support said tubular conduit, wherein a longitudinal axis of each of said plurality of extraction conduits is substantially parallel to an outer face of said tubular conduit.

5. The apparatus of claim 1, further comprising a first and a second shearing member, said first and said second shearing members being so constructed and arranged to cooperate with each other to provide a shearing action to said substance to be mixed, said shearing members being disposed at a level where said rotary member extracts said substance from said axial channel and forces said substance into said annular channel;

said first shearing member being connected to said tubular conduit, and said second shearing member being connected to said carrier shaft; wherein said carrier shaft has a female-threaded bore adapted to threadingly engage a male-threaded bore of said rotary device, and wherein said second shearing member has a central bore therethrough through which said male-threaded bore of said rotary device may pass, whereby said second shearing member is supported between said rotary device and said carrier shaft;

said second shearing member comprising a plate having a first face abutting against an axial stop face of said carrier shaft, and a second face of said plate abutting against an upper face of a flange extending radially outwardly from an upper portion of said rotary device; and wherein said second face of said plate of said second shearing member having means for receiving connector elements therethrough for rigidly securing said second shearing member to said axial stop face of said carrier shaft.

6. The apparatus of claim 1, wherein the carrier shaft guiding means is supported by said stand, and a rotating sealing means is disposed between said stand and a portion of said carrier shaft located in said collection chamber, said rotating sealing means further comprising:

a first ring and a second ring, said first ring being connected to said stand, said second ring being connected to said carrier shaft;

said first ring and said second ring each having a face disposed to orthogonal to an axis of rotation of said carrier shaft, said faces of said first and second rings slidingly engaging each other and closing an external wall of a cavity formed between said stand and said carrier shaft, said cavity being substantially coaxial with said collection chamber, and said cavity being so constructed and arranged to channel a heat exchange fluid therethrough for cooling said first and second rings.

7. The apparatus of claim 1, wherein said carrier shaft has a plurality of radially extending vanes on a portion of said carrier shaft positioned within said collection chamber.

8. The apparatus of claim 1, wherein said stand further comprises support structure engagement means whereby said stand is capable of being supported by a structure that can be supported on a horizontal support to suspend said container at a distance from said horizontal support.

9. The apparatus of claim 1, wherein said first bearing surface of said interface member is formed of a first centering surface, a first axial support surface, and a first sealing surface, and wherein said second bearing surface of said interface member is formed of a second centering surface, a second axial support surface and a second sealing surface, and wherein said first and said second centering surfaces define cylindrical forms extending substantially parallel to said longitudinal axis of said cavity, said first and said second axial support surfaces are disposed in first and second planes that are orthogonal to said longitudinal axis of said cavity, and said first and second sealing surfaces are disposed in third and fourth planes that are orthogonal to said longitudinal axis of said cavity.

10. The apparatus of claim 1, wherein said container is supported and fixed to said stand by way of said interface member, said interface member being secured to said container by press fit of said container bearing surface with said complementary first bearing surface of said interface member, and said stand is secured to said interface member by press fit of a stand bearing surface to a complementary second bearing surface of said interface member.

* * * * *